Fig. 1.

INVENTOR
Charles H. Scott
BY William J Fox
ATTORNEY

Sept. 1, 1953 C. H. SCOTT 2,650,707
SEDIMENTATION APPARATUS
Filed Nov. 28, 1951 10 Sheets-Sheet 2

Fig. 2.

INVENTOR
Charles H. Scott
BY William J Fox
ATTORNEY

Fig. 8.

Sept. 1, 1953 C. H. SCOTT 2,650,707
SEDIMENTATION APPARATUS
Filed Nov. 28, 1951 10 Sheets-Sheet 7

Fig. 9.

INVENTOR
Charles H. Scott
BY *William J. Fox*
ATTORNEY

Sept. 1, 1953   C. H. SCOTT   2,650,707
SEDIMENTATION APPARATUS
Filed Nov. 28, 1951   10 Sheets-Sheet 9

INVENTOR
Charles H. Scott
BY William J. Fox
ATTORNEY

Patented Sept. 1, 1953

2,650,707

UNITED STATES PATENT OFFICE 2,650,707

SEDIMENTATION APPARATUS

Charles H. Scott, Westport, Conn., assignor to The Dorr Company, Stamford, Conn., a corporation of Delaware Application November 28, 1951, Serial No. 258,660

11 Claims. (Cl. 210—55)

The invention of this case relates to sedimentation units and apparatus for or employable therein, and more particularly to a novel sediment raking means employable therein or constituting a part thereof. A typifying example of a sedimentation unit and of a sediment raking mechanism to which the invention hereof applies is indicated by the showing in the Graner U. S. Patent 2,528,051, granted October 31, 1950. In fact said Graner patent includes claims broadly dominating certain features of construction shown and described herein. However, it is pointed out that certain features of construction forming the basis of this invention constitute improvements either over or on said Graner construction.

Certain reference characters employed in the section immediately following designate and refer to parts the like of which under the same identifying designating number appear in connection with certain basic features of construction that are continued and employed in the structure of this case and are readily ascertainable and identifiable from the drawings hereof.

The invention hereof has in view the elimination of a submerged low steady bearing 74 of the Graner patent, which bearing was disposed between the low end of Graner's torque tube 71 and a liftable rake-arm carrying shaft 31, in the form of a tube of outside diameter smaller than that of the inside diameter of said torque tube. In the construction shown in that patent, as well as the construction of the case at hand, the liftable shaft 31 is mounted so as to be turnable about a vertical axis and carries from the lower end thereof a set of two outwardly-extending rake arms 33. The upper end portion of the liftable shaft 31 is maintained in a true concentric arrangement with respect to the extreme upper portion of such torque tube through the medium of a high guide ring or sleeve provided at that locality, to wit, between the interior of the torque tube or carrying member therefor on the one hand and the interior of the vertically-extending liftable arm-carrying shaft 31 on the other hand.

In order to insure concentricity as between the lower inner end portion of the torque tube and the liftable shaft 31 carrying said rake arms 33, there was provided in the Graner construction the lowly-disposed steady bearing 74 as embodied by a ring located within and carried by the lower end of the Graner torque tube 71. While the lowly-disposed Graner ring 74 functioned as a guiding and centering element it was so located that it always functioned in submergence and this constituted an objectionable feature. A further objectionable feature respecting the aforementioned low steady bearing 74 of this Graner patent was inaccessibility for inspection or otherwise. The functioning of said low steady bearing, always being in submergence, also meant that it was in a region where gritty or other objectionable media in the liquid-solids undergoing treatment had, or might have, detrimental effects upon the functioning and operation thereof, particularly as by imposing detrimental wearing effects upon the parts engaged thereby, namely, to and upon the liftable shaft 31 which had sliding movements—up and down as the case may be—within said low bearing as raking operations were carried out within the tank.

In order to be able to eliminate said low bearing one has to provide some type of construction which can be embodied in the raking mechanism as a whole whereby the concentricity between the liftable shaft and the torque tube 71 will be maintained. To this end applicant has devised and has embodied in the apparatus hereof sets of stabilizing rods which, when incorporated, constitute part of the construction which is herein often referred to as a straight-line linkage mechanism, or as a parallel-motion linkage mechanism. The straight-line mechanism just referred to, when embodied as hereinafter described, results in a power-actuated sediment raking mechanism built along the general lines shown, described and broadly claimed in and by the Graner patent, but of a changed type of construction that avoids any necessity of the employment of a low steady bearing or ring carried within and by the low end 72 of the torque tube 71 of the Graner patent, as will hereinafter more fully appear.

It is here pointed out that the entire structure of the sedimentation unit of this case and the sedimentation unit of the Graner patent find a substantial counterpart of one for the other but with a main specific exception, to wit, in that by the use of the heretofore referred to straight-line linkage mechanism as resulting from the embodiment of the aforementioned stabilizing rods there is avoided the employment and likewise any necessity for the employment of a low steady bearing as Graner bearing 74 which was carried within and at the low end 72 of the Graner torque tube 71, to wit, for insuring concentricity between the low end 72 of said torque tube on the one hand and the vertically liftable rake-arm carrying shaft 31 on the other hand. In the instance of this case there is another slight divergence in construction from the Graner structure, as will hereinafter appear, to wit, in the Graner construction there is a double pivoted compensating link construction provided at and between the outer small end of each of two power transmission arms 80 and underlying the outer portion of corresponding rake carrying arms 33. In this case, as to the compensating constructions at the small outer ends 82 of the power transmission arms 80, each said arm 80 has a small parallel faced box portion rectangular in cross-section that is slidably mounted in a corresponding open-ended sleeve construction that is fixedly attached to an underlying portion of a corresponding rake carrying arm 33, whereby there is provided a new slidable type of arm driving compensating construction.

The foregoing expresses in a general manner certain features of construction to which the invention of this case is directed, to wit: (a) to the new slidable type of compensating construction and (b) to the straight-line linkage or parallel-motion linkage mechanism.

As to the straight-line linkage mechanism, it should be borne in mind that certain geometric factors must be taken into consideration in the physical embodiment thereof. Also as to the slidable compensating construction, certain details can well be borne in mind.

As to the foregoing they are described in detail in the subsequent portion of this specification.

The above-mentioned objects and novel features of the invention hereof, as well as other advantages and novel features of construction, will become manifest from and are set forth in the following description and in the claims hereof. Herein parts will be identified by specific names for convenience, but they are intended to be generic in their application to similar parts as the art will permit.

The accompanying drawings constituting part of this specification show the physical arrangement of the parts and forms thereof and the modes of realization of the different aspects of the invention hereof. The names of the parts and expressions used in defining the same are intended to be generic in this application to similar parts, particularly insofar as they relate to the embodiment and employment herein of that which has herein been referred to as a straight-line or parallel-motion linkage mechanism and also insofar as they relate to the slidable compensating mechanism, each of which mechanisms has been embodied in and made part of the power transmission mechanism between the torque tube 71 on the one hand and the liftable rake-arm carrying shaft 31 or rake carrying arm 33 on the other hand.

In the main the disclosure and description as presented in said Graner Patent 2,528,051, to which the invention hereof is particularly applicable, apply to the description hereof, but there has been incorporated herein the description presenting the embodiment of the stabilizing rods and of the straight-line linkage mechanism in which said stabilizing rods have been incorporated, all of this in a manner whereby to obtain and clearly define a construction which will avoid the necessity of a submerged steady bearing—as the low steady bearing 74 of the Graner patent which was disposed between the interior of the low end 72 of the torque tube 71 on the one hand and the liftable rake-arm carrying shaft 31 on the other.

As illustrative of a construction wherein the invention hereof can be advantageously utilized, reference is hereby made to the accompanying drawings constituting a part of this specification.

In said drawings:

Fig. 3 is a perspective diagrammatic type of view of that portion of the sediment-raking mechanism wherein the novel features and basic embodiments essential for the realizing of the invention hereof are indicated, and particularly for the employment of the straight-line or parallel-motion linkage mechanism as disclosed and employed in said sediment-raking mechanism. Also in this figure there is indicated the position of three main outwardly-extending chords of a rake-carrying arm triangular in cross-section and secured to said arm there is the hollow open-ended sleeve that receives the small outer end of a corresponding power-driven transmission arm, which small outer end is box-shaped and rectangular in cross-section and is slidably mounted in the aforementioned open-ended sleeve, thereby providing a slidable type of compensating driving connection disposed between the outlying end of the transmission arm on the one hand and the underlying portion of the corresponding rake carrying arm on the other.

Fig. 10 is a vertical view partially in section indicating the low position of the liftable rake arm, the low position of the liftable rake arm carrying shaft, the position of the torque tube of constant elevation through and downwardly from which the liftable rake-arm carrying shaft extends, the position of the straight-line linkage mechanism having the upper ends of one set of linkage-providing elements hingedly connected to the lower end of the torque tube and the lower ends of a lower set of linkage elements provided by stabilizing rods hingedly connected to a low portion of the liftable rake-arm carrying shaft at a locality above the rake carrying arms, the expansible and contractible means by which the liftable rake-arm carrying shaft and thusly by which the rake arms extending from the latter are supported and lifted, the motivated bull gear or main turntable which is supported at constant elevation from and with respect to the stationary frame structure that is positionably and fixedly associated with the tank, and the stationarily carried support tube that derives support from said frame structure and which in turn supports at fixed elevation a stationary cylinder element of the lifting means. By the support tube the cylinder is not only supported but it also serves as means by which pressure fluid—such as oil—is supplied to the cylinder of the lifting means for raising a liftable piston therein or from which cylinder the pressure fluid is released when the lifting means is contracting, that is to say, when the liftable piston within the cylinder is moving downwardly.

Reference is now made to the drawings in detail.

In and according to this case, as well as in and according to said Graner Patent 2,528,051:

There is a sedimentation unit having a tank 10 with bottom 11, a marginal wall 12 circular in plan rising from the tank bottom 11, a central sump 16 for receiving sedimented material progressively transferred toward and thereinto by a sediment-raking mechanism collectively designated 25, having a set of outwardly-extending rake-carrying arms collectively designated as 33 and turnably supported from the lower end portion of a liftable and lowerable vertically-extending tubular rake-arm carrying shaft 31 which is supported so as to have guided and positionably controlled movement about a vertically-extending axial line the location of which is determined by a center support tube 43 that is dependingly carried by and from stationary channel-shaped members 21 embodied in and serving as part of a stationary framework structure 20 that in turn is supported by uprights 70 secured to and extending upwardly along and beyond the marginal wall 12 of the tank.

Figure 1:
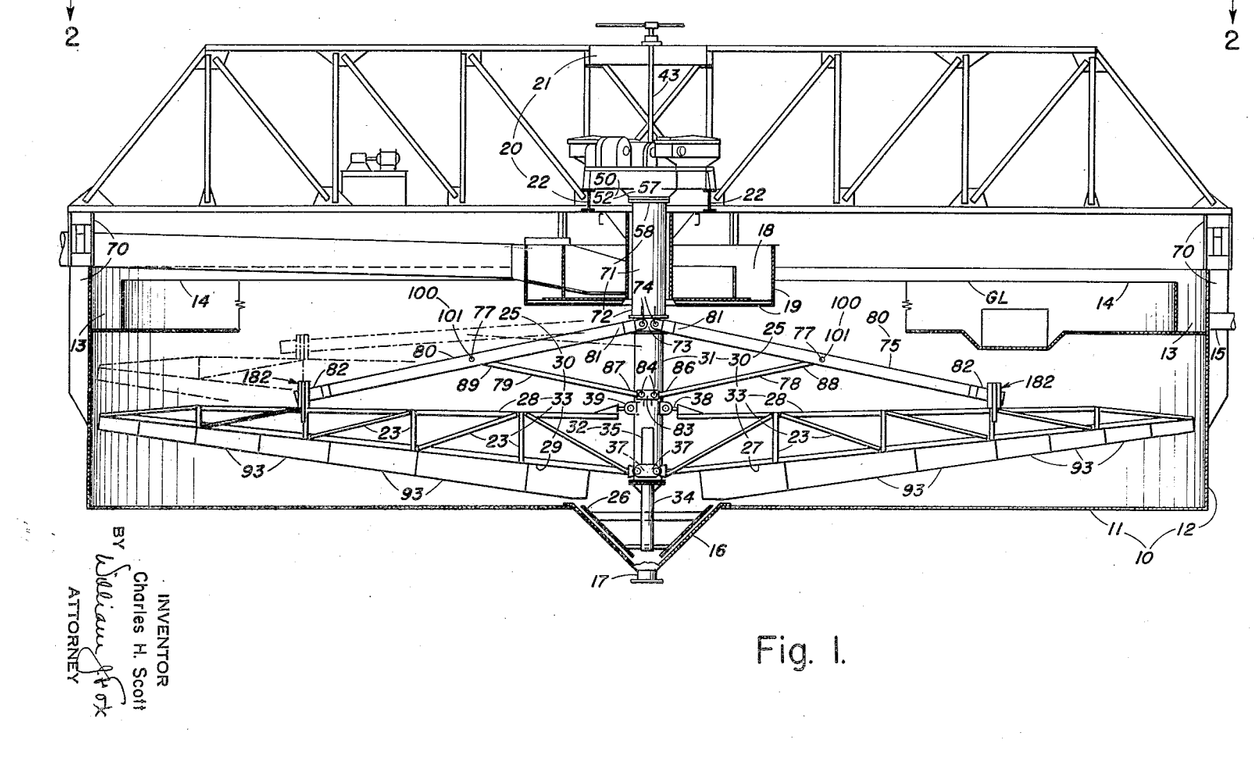
Fig. 1 is a vertical sectional view and Fig. 2 is a plan view, each of a portion of a sedimentation unit having a marginal wall symmetrical in plan and a sediment-raking mechanism associated therewith of a general type for embodying and employing the invention hereof.
Figure 2:
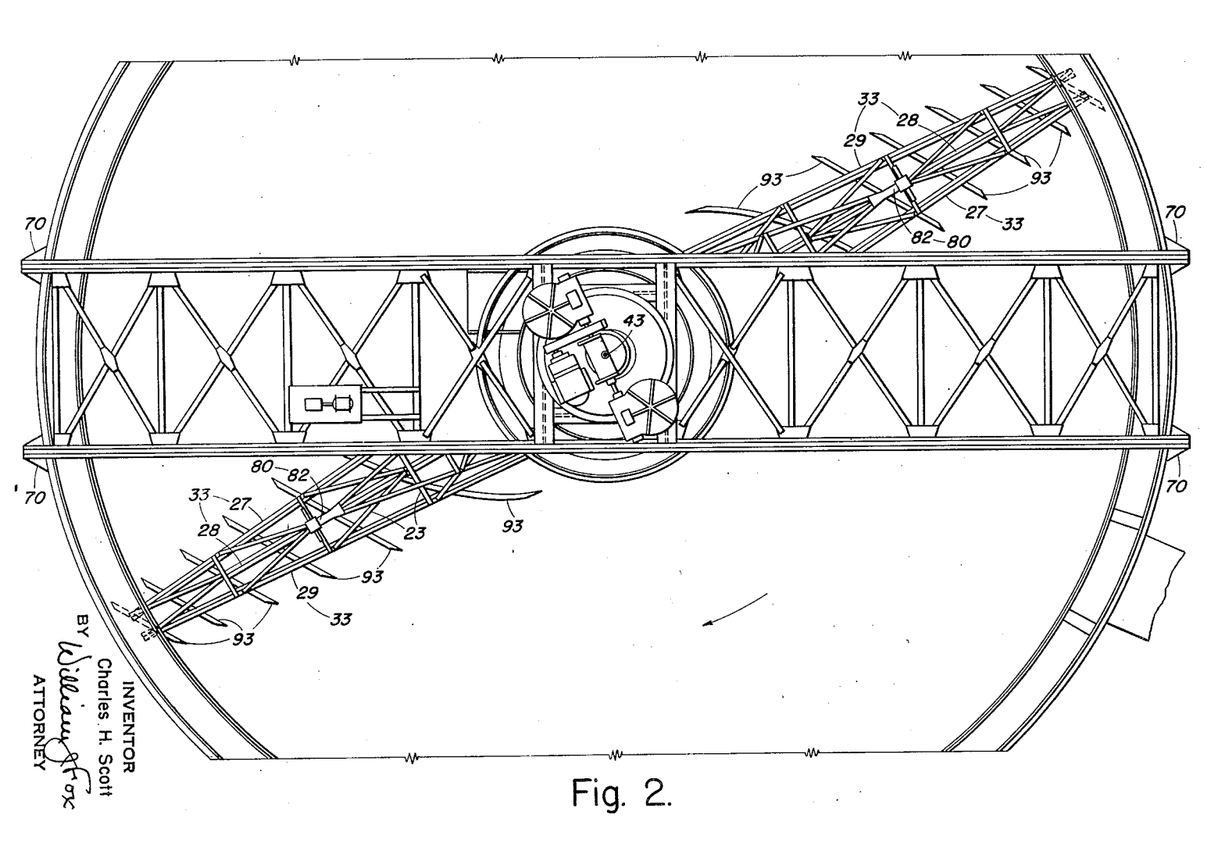

The sediment raking mechanism above mentioned and which is collectively designated as 25 comprises (see Fig. 1) a liftable rake arm carrying shaft 31 with the rake arms connected to and carried from the lower end of said shaft 31 through the medium of low rake arm supporting connections 32 and also through a set of upper adjustable bolt-like connecting means embodying a rigidly positioned hinge connecting member 38 which is turnably mounted on an upper inner portion of the upper chord 28 of the respective rake arm. As to the intermediate frame structure 32 referred to, as constructed for each of the rake arms, this includes connecting elements such as braces and struts 35 and 36 and spacedly disposed connecting members 37 therefor as part thereof. In this connection reference is made not only to Fig. 1 but also to Figs. 3, 4, 5, 8 and 9.

Figure 10:
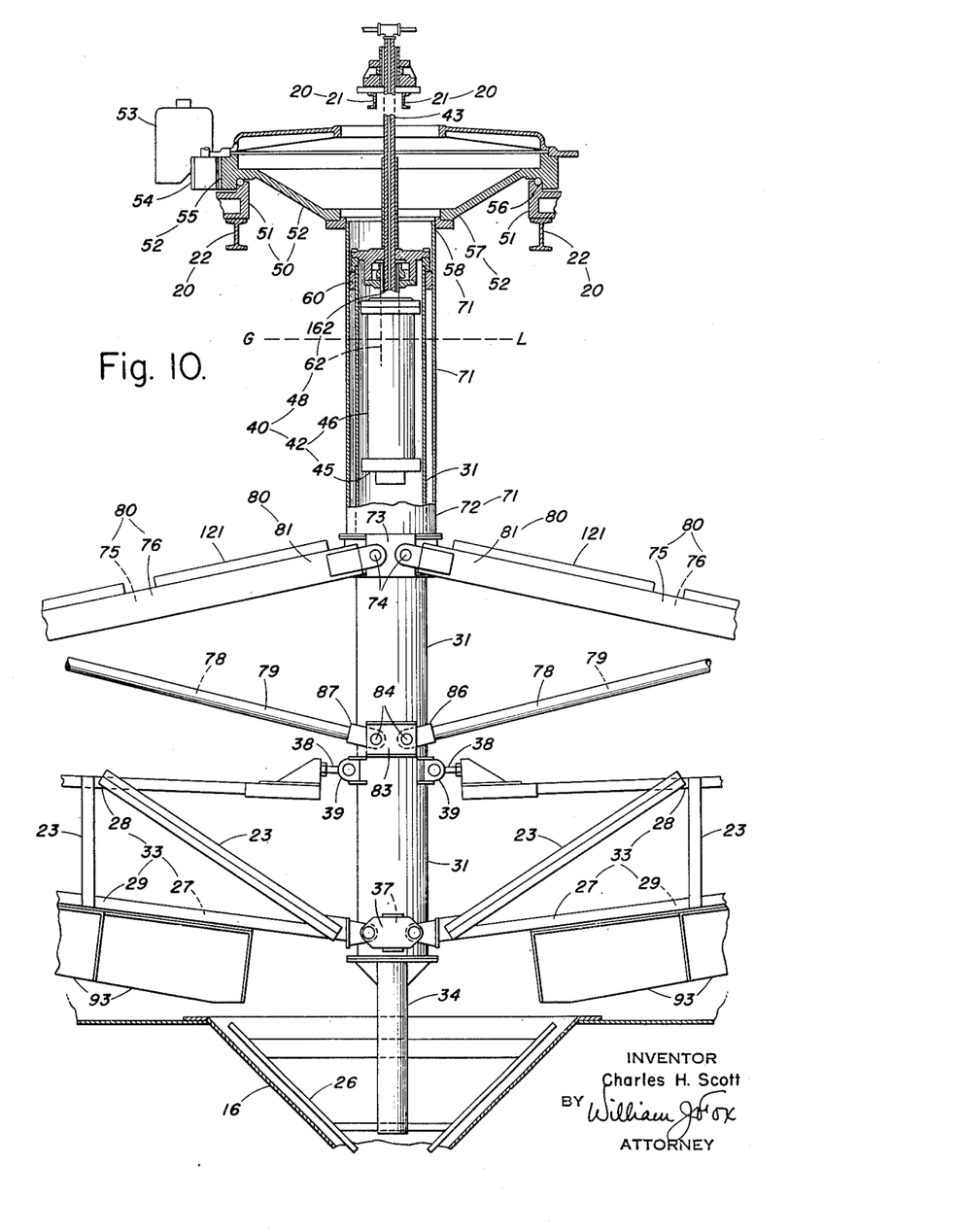

There is stationarily mounted on I-beams 22 of the stationary frame structure 20 (see Figs. 1 and 10) a main bearing 51 of constant elevation constituting the base of a main turntable construction 50 of which a main turntable 52 is provided by a bull ring or gear that is actuated through the medium of motivated power transmission gearing 53 having a terminal spur gear 54 the teeth of which spur gear are large and have driving engagement with the teeth 55 of the bull gear 52. This bull gear or main turntable 52 is mounted on the main bearing 51 through the medium of a series of anti-friction balls in a circular bearing raceway 56 of the main bearing 51 and which raceway is concentric with the aforementioned vertically-extending axial line as determined by the center support tube 43. The bull gear 52 has an inwardly and downwardly extending body portion 57 (see Figs. 10 and 11) and the upper end 58 of a depending torque tube 71 is detachably secured to said inwardly-extending body portion 57 so as to be concentric with said raceway 56 and with said main axial line. The lower end 72 of the torque tube 71 terminates within the liquid-holding portion of the tank and is at a fixed elevation always spacedly above that of the inner end portion of the rake carrying arms 33 which are carried by and are raisable and lowerable with the vertically-extending rake arm carrying shaft 31.

At this time one can well note that the rising tank wall 12 has a marginal launder 13 circular in plan with an outflow pipe 15 leading therefrom to a region outside of the tank. The launder has an overflow weir edge 14 that determines the general surface level of an ever-changing liquid-solids body of feed material undergoing treatment or, as otherwise expressed, undergoing quiescent sedimentation within the tank. A liquid-solid feed supply means supported from the frame 20 terminates in a centrally located feedwell 18 (see Fig. 1) having feed discharge openings 19 by which the feed material is submergedly delivered within the upper portion of the tank at elevation lower than that of the elevation of the overflow weir edge 14. The location of the general or normal surface level G—L of the body of liquid within the tank is determined by the elevation of the overflow weir edge 14 and is readily apparent from an inspection of Fig. 1. As to Figs. 10 and 11 the location of the general surface level of the body of liquid-solids relative to the operative parts indicated by said figures will be appreciated since the general surface level is indicated in said Figs. 10 and 11 by the dot-and-dash horizontal line marked G—L.

It has heretofore been pointed out that the sedimentation unit has a vertically-extending rake arm carrying shaft 31 which is liftable and turnably supported through the medium of an expansible and contractible lifting means collectively designated 40, embodying a lifting member of constant elevation provided by a cylinder 42 having a low cylinder head 45 fixedly connected to and deriving carrying support therefor from the lower end of the central support tube 43 and also having a cylindrical wall portion 46 rising from said head. The expansible and contractible lifting means 40 also embodies a liftable member provided by a vertically movable piston 48 having a low piston head 61 and a tubular piston rod 62 rising from said piston head 61 and sufficiently long whereby when said piston head is in low position therefor with respect to said cylinder 42 the upper end of the tubular piston rod extends to elevation substantially higher and beyond that of the upper end of the cylindrical wall of the cylinder 42 which is of fixed elevation. As to the piston head 61 (see Fig. 11) it is to be noted that it is constructed so as to be annular in plan and has pressure-type fitting engagement with the cylindrical smooth surface of the exterior of the support tube 43 and with the interior smooth surface of the rising cylindrical wall 46 of the cylinder 42. Also it is to be noted that spacing blocks or means 145 are provided between the upper face of low cylinder head 45 and the under face of the annular piston head 61 whereby there always exists between said heads a space for receiving liquid forced into and through the flow pasasgeway 44 provided within the center support tube 43 and therefrom through the oil flow openings 47 at the low end of support tube 43 into the pressure liquid receiving space between the cylinder and piston heads for raising the piston. When or as the piston is lowering there is permitted a back flow of released pressure liquid—preferably oil—through said openings 47, thence into and upwardly within and from the center support tube 43. Also at this juncture one should note that there is a guide ring in the form of a guide head 49 that is suitably secured to the upper end 146 of the cylindrical wall 46 of cylinder 42. This ring or head 49 serves as a centering guide for and about the tubular piston rod 62 rising from the low annular piston head of the raisable and lowerable piston or piston element 48. The piston guide ring 49 is provided with an air pasageway opening whereby to avoid any air blocking of the vertical movements of the piston with respect to the cylinder 42 of fixed elevation. Also one should note the liftable piston 48 is the member that has to be relied upon for the raising or the lowering, as the case may be, of the raisable and lowerable vertically-extending rake arm carrying shaft 31. The construction whereby this end is attained is being fully described in this case—it is also found in said Graner patent.

In the construction of this case, as well as in the Graner patent, there are included the following parts arranged as herein pointed out, namely: on the upper end 162 (see Fig. 11) of the tubular piston rod 62 of the movable piston element 48 there is a liftably supported bearing member 64 of an auxiliary turntable construction 63; there are anti-friction balls 65 which are guidably mounted on a raceway member 59 of said liftably supported bearing 64, said balls 65 in turn carry and guidably support an upper turnable bearing 66 of an auxiliary turntable 67 of the auxiliary turntable construction 63 which is raisable and lowerable as a whole relative to the turnable torque tube which is of stationary elevation. As to the thus raisable and lowerable auxiliary turntable 67 this has detachably connected thereto and depending therefrom an upper ring member 68 which in turn is fixedly connected to the upper end of the vertically-extending and liftable (or lowerable, as the case may be) rake arm carrying shaft 31 that is spacedly disposed within the depending torque tube 71 and extends downwardly through and below the lower end 72 of the torque tube 71. In this connection it will be noted that the interior diameter of the torque tube 71 is substantially larger than the exterior diameter of the liftable shaft 31. Between the lower interior central portion 57 of the bull gear 52—or as otherwise expressed, between the upper end 58 of the depending torque tube 71 which is detachably connected to the lower interior central portion 57 of the bull gear 52—there is provided a high unsubmerged guide ring as 60 with which the uppermost end portion of the vertically-extending raisable and lowerable rake arm carrying shaft 31 has sliding and guiding centering engagement with respect to the torque tube 71. By the construction and means as just described the following several members or parts in the immediate vicinity of each other are retained and maintained in concentric arrangement, namely (1) the bull gear 52 and particularly the low central portion 57 thereof, (2) the upper end 58 of the torque tube 71, (3) the guide ring 60 and (4) the upper end 131 of the vertically-extending rake arm carrying shaft 31.

In the construction of the Graner patent and also in the construction of this case the force required for imparting turning movement to the set of rake arms collectively designated 33, which set is turnably supported by and from the lower end portion of the liftable but turnably mounted rake-arm carrying shaft 31, is attained through the medium of two outwardly-extending power transmission arms 80 having widely spaced inner ends or inner end portions 81. The inner end portions 81 and narrow outer ends 82 are hingedly connected to horizontally-spaced hinge, or hinge pintle providing, members 73 secured to and horizontally disposed from and with respect to the lower end portion 72 of the torque tube 71. The narrow outer end 82 of each power transmission arm 80 has a sliding type of driving connection to a corresponding rake arm through the medium of a hollow open-ended sleeve construction or sleeve member 182 fixedly secured to a portion of the rake arm directly underlying the narrow outer end 82 of the corresponding power transmission arm 80 whereby there is permitted a proper in-and-out movement of the narrow outer end 82 of the particular power transmission arm 80 relative to the open-ended sleeve corresponding thereto as the rake arms are lifted or lowered as a set, to wit, through the medium of the vertically-extending rake-arm carrying shaft 31, as and when the latter is vertically moved.

Figure 3:
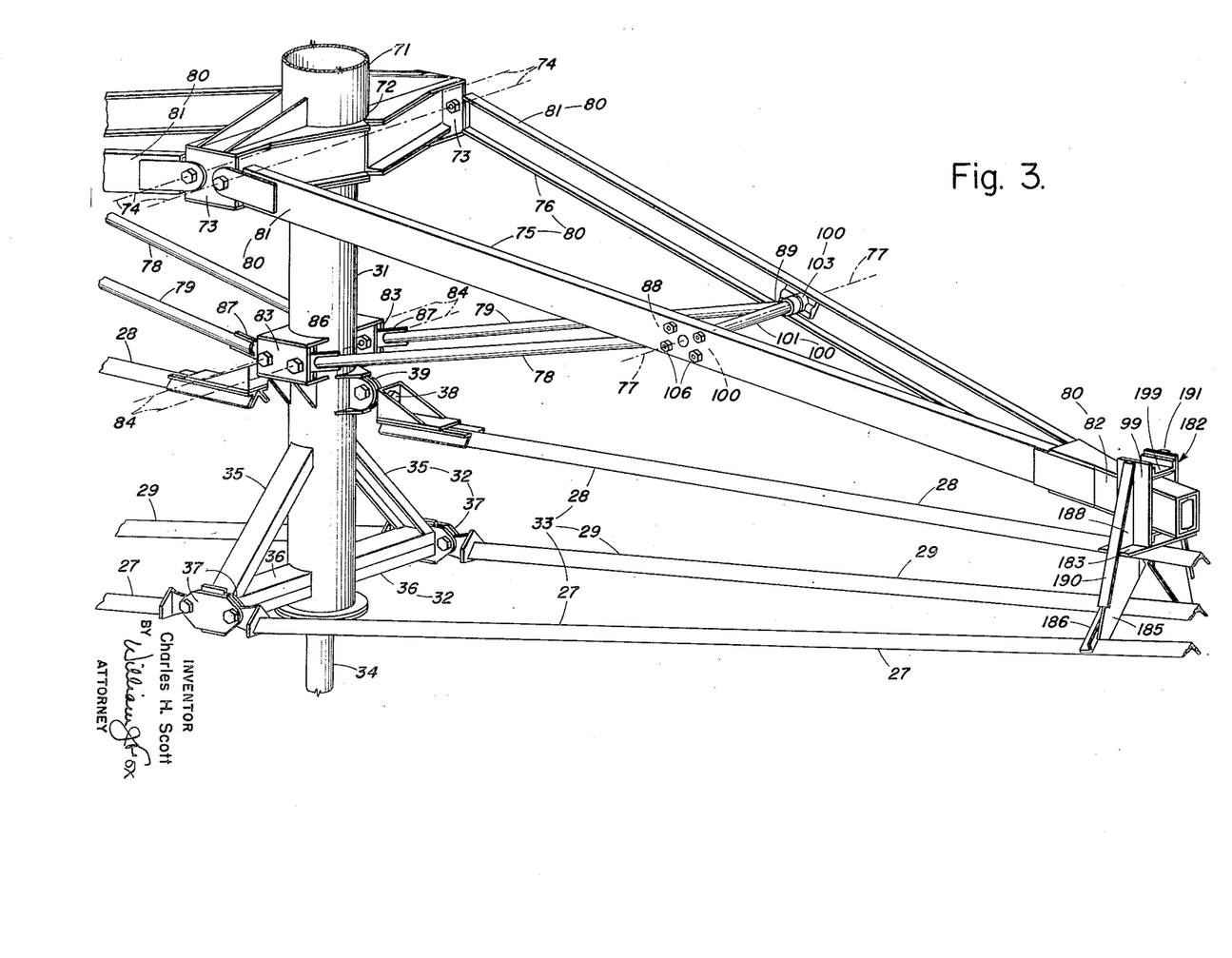
Figure 4:
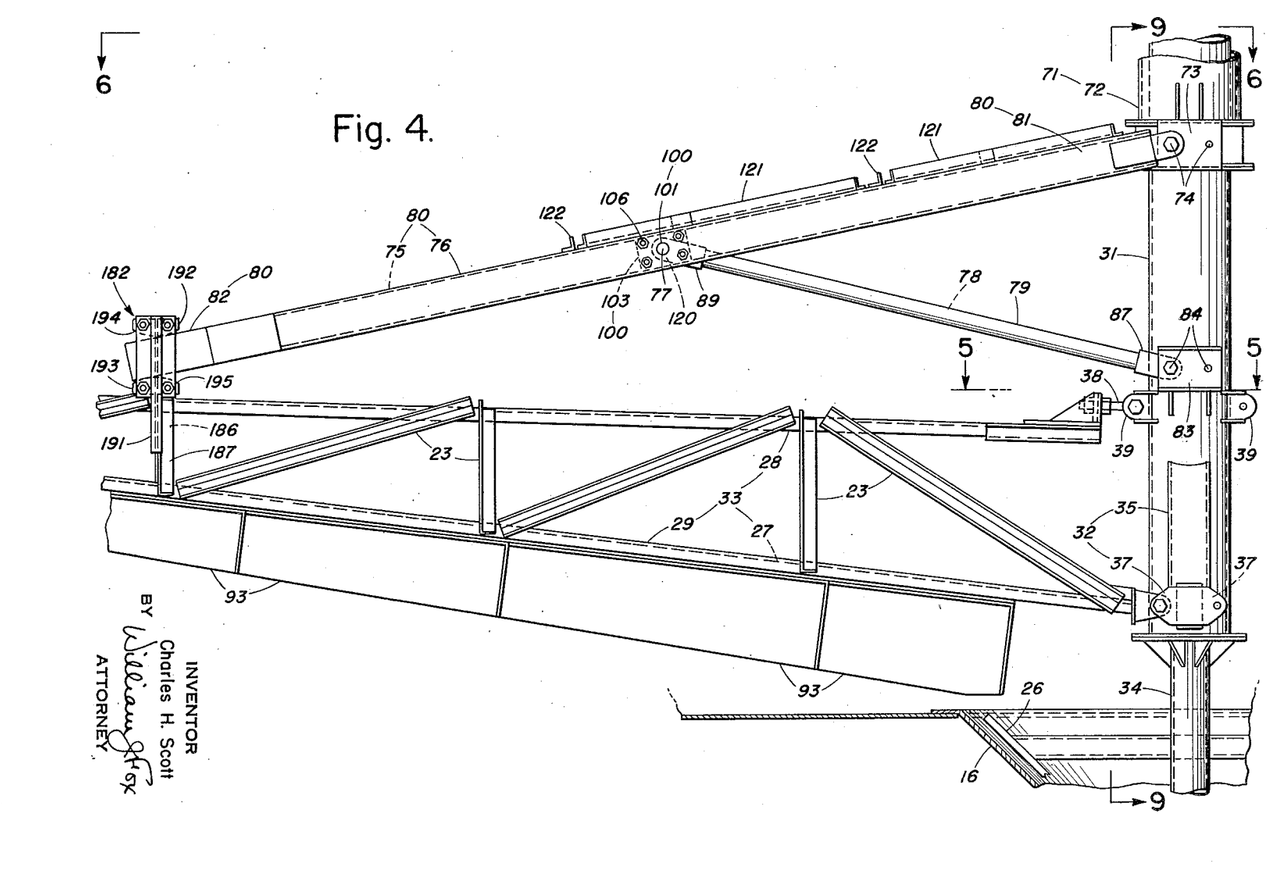
Fig. 4 is a vertical view indicating a portion of the low end of the torque tube, a portion of the rake-arm carrying shaft extending downwardly from within the torque tube and disposed in extended low raking position for the raking mechanism. In this view the stabilizing rods are shown in their lowest position with respect to the power transmission arm to which said rods correspond.

The driving connections referred to are of a construction to prevent any lateral movement of the rake carrying arms 33 relative to the outer ends 82 of the power transmission arms 80. Tersely stated, the hinged mountings for the spaced inner ends 81 of the power transmission arms 80 are such as to permit upward and downward swinging movement about a horizontally-extending pintle axial line 74—74 determined by the horizontally-spaced hinge members 73 and more particularly by the pintle axial providing elements thereof. As to the power transmission arms 80 of this case, the same have two main side bars provided by rolled channel-iron front and rear side bars of which the upper and lower flange portions of the channel-irons extend toward each other. The power transmission arms, as already indicated, have widely spaced inner end portions 81—81, they extend outwardly in a general radial direction, the front and rear side bars progressively approach each other and in effect merge into and provide small box-shaped outer end portion or box-shaped construction 82 of rectangular formation in cross-section that is slidably mounted in an open-ended sleeve element 182 that is fixedly secured to and upwardly extending from an underlying rake arm corresponding to the particular power transmission arm, to wit, as shown in Fig. 3.

Also in order to impart lateral rigidity to the power transmission arms 80 of this case there are provided X-shaped cross bracing struts 121 and horizontal struts 122 (see Fig. 6) of rolled structural shapes such as angle irons that are rigidly connected as by welding to the rolled channel side bars, to wit, to the front channel bar 75 and the rear channel bar 76 of the power transmission arms 80. In this connection it is to be noted that the rake arms 33 and the power transmission arms 80 move in a forward clockwise direction and the front channel bars 75 are foremost while the rear channel bars 76 are rearmost in respect to the direction of travel therefor.

The channel-shaped side bars 75 and 76 when in place slope downwardly and converge inwardly until they come together at the outer ends 82 of the arm 80 to which they belong, whereat they are bent into parallelism to provide, when connected together, the box-like sliding end section at the outer end 82 of the arm. The open-ended sleeve element 182 that receives the slidable box-like end section 82 is suitably secured in place on the rake carrying arm 33 that includes the chordal elements 27, 28 and 29 that are connected to form or provide a relatively rigid rake carrying arm formation.

The pintle hinge providing elements 73—73 determine the location of two horizontally-spaced paralleling horizontally-extending pintle axial lines 74—74 and 74—74, and which are sometimes referred to herein as high centrally located or as high inwardly disposed pintle axial lines of constant elevation.

*Slidable compensating means at 82 and 182*

As to the construction of the slidable driving element or compensating means construction 90 provided at the outer ends of the power transmission arms 80 and the underlying portion of the rake arms 33 corresponding thereto, this is provided by a construction which embodies a rectangular box-shaped or box type of construction provided at the outer end 82 of the power transmission arms and an open-ended sleeve construction or sleeve construction 182 provided at and on an underlying section of a rake arm corresponding to the particular power transmission arm. In this connection reference is made to Figs. 3, 4, 6 and 7.

As to the open-ended sleeve construction, it will be observed that for this there is employed a relatively horizontally-, transversely- and longitudinally-extending plate member 183 suitably connected as to the upper chord 28 of the rake arm 33; a lower horizontally- and transversely-extending tie member 184 connected to the lower chords 27 and 29 of the rake arm 33; a pair of right and left upwardly- and transversely-extending stiffening plates as 185 providing a rigid connection between angle irons 186 and 187; upwardly- and inwardly-slanting front and rear tie plates 190 and 191 and the relatively horizontal tie plate 183; and a pair of right and left transversely-spaced upwardly-extending side plate portions or members 188 and 189 disposed between the upper portions of the upwardly- and inwardly-slanting front and rear tie plates 190 and 191; the vertically-extending side plates of the open-ended sleeve construction 182 and the upper face portion of cross plate 183. A top U-shaped cross member 199 is rigidly secured in place and connected in a manner to constitute part of a holding structure for the open-ended sleeve construction 182 of hollow rectangular cross section. In said sleeve there are provided upper and lower filler-type of slide blocks 192 and 193 of which (see Fig. 4) the lower face or slide portion 194 of the upper member 192 has a downwardly convex curved guiding portion, while the upper face or slide portion 195 of the lower member 193 has an upwardly convex curved guiding portion, the outer end 82 of the power transmission arm is, as has been previously described, a rectangular box-shaped construction that has sliding fitting engagement within the open-ended hollow sleeve construction just described as being located upon and fixedly secured to the rake arm—to wit, at a location outwardly disposed a substantial distance with respect to the location of the pintle shaft 101 hereinafter described. The result of this sliding construction is such that, as the rake arms as a whole are lifted, the outer box-shaped ends 82 of the power transmission arms 80 have a sliding outward movement with reference to the underlying rake arm and whereby, as the rake arms are lowered as a set, there will follow an inward sliding movement of the outer end of the power transmission arm with respect to the raking structure.

*Liftable shaft 31, rake arms 33 supported therefrom and carrying connections between shaft 31 and rake arms 33*

In this case there has been incorporated Fig. 3, which is a perspective view showing the physical relationship and features of construction of the main outwardly-extending chordal elements of the rake arms 33. In said Fig. 3 it will be noted that there is a low front chordal member 27, an upper chordal member 28 and a low rear chordal member 29, which afford or constitute the basis of a rake arm construction triangular in cross-section. In said Fig. 3 there is an upper supporting connection or connecting element provided on and extending from the liftable shaft 31 as at 39 (also see Figs. 4, 5 and 9) at an elevation and locality adjacent the inner end of the upper chord 28 of a rake carrying arm 33. Also extending from the liftable shaft 31 there are forwardly- and rearwardly-extending sets of members 35 and 36 having spacedly-disposed connecting members 37—37 for operatively positioning and supporting the inner ends respectively of the low forward chord member 27 and the low rear chord member 29 of the rake carrying arms 33. These low chord members are connected to what may be viewed as a rigidly positioned hinge connecting member for receiving and supporting the low inner end portions of the rake arms. The upper member 39 is disposed for receiving a connecting element—to wit: the adjustable bolt member 38—extending from the inner end of the upper chord 28 to that connecting element or upper member 39 which is fixedly secured to the liftable shaft 31. The connecting element 38 just referred to may be adjustable so that, by pulling the upper chord member towards the shaft 31 the arm as a whole can be adjusted as to the outer end thereof with reference to the underlying floor or bottom of the tank. The positioning of the connecting elements which are on the vertically-extending shaft 31 are clearly indicated in Fig. 3 and also Fig. 9. In the latter Fig. 9 it will be noted that there is a further descending portion or section 34 of the shaft 31 by which there are supported sludge rakes as 26 that are functionably disposed within the central sump portion 16. A sediment discharge pipe 17 leads from said sump.

Figure 9:
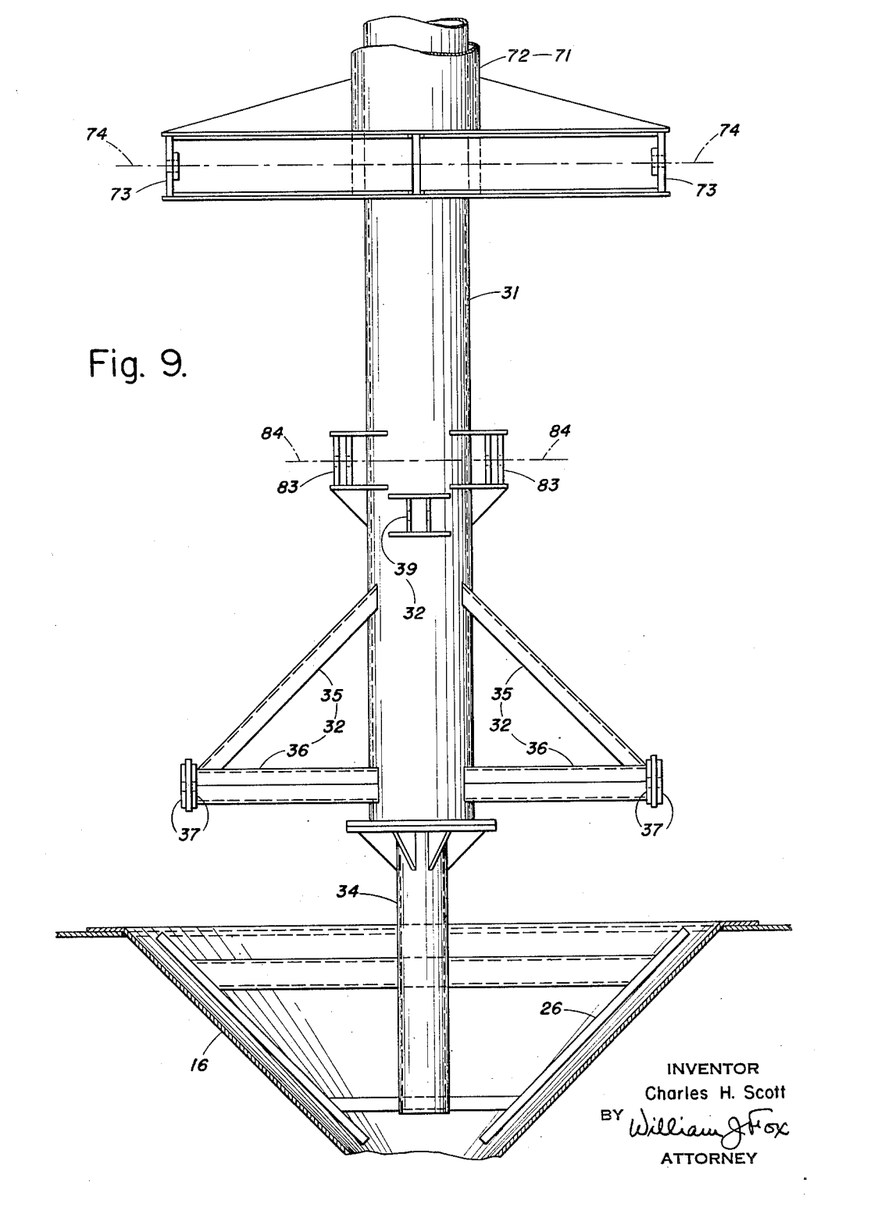
Fig. 9 is a view of the lower end of the torque tube and of the structural hinge-providing elements that are rigidly connected thereto and constitute part thereof. In this view there is also indicated that section of the liftable rake-arm carrying shaft that extends downwards into, within and from the torque tube and also the lower end section of the liftable rake-arm carrying shaft from which there extend and appear certain structural elements constituting part of the means from and by which the rake arms are carried. This is a view looking from what would be the outer end of a rake arm towards the torque tube and the liftable rake-arm carrying shaft.

Also in Fig. 9 there will be seen the location of the horizontally-spaced hinge members 73 that provide the horizontally-extending pintle axis 74 and thusly determine the location of the widely-spaced inner end sections 81—81 of the swingably-mounted outwardly-extending power transmission arms 80. In this same view one will note the horizontally-spaced hinge providing elements 83 that determine the location of a low horizontally-extending pintle axis 84 to which the low inner end sections of the stabilizing rods 78 and 79 employed herein are located and hingedly mounted. From Figs. 9 and 10 it will be appreciated that a considerable low portion of the vertically-extending liftable shaft 31 is employed and used for carrying the rake arm supporting connections, while the extreme lowermost portion of that shaft is employed for carrying the lowly-positioned sump rakes. Thus there is left only a relatively short space or shaft length between the low end 72 of the torque tube of constant elevation on the one hand and the rake arm connecting elements or hinge members 73 as carried by the shaft on the other hand. In order to device a construction which will effectively maintain concentricity between the low interior portion 72 of the torque tube 71 and the exterior of the liftable shaft 31, the latter of which is of substantially less diameter than that of the interior of the torque tube, applicant has devised and resorted to a parallel-motion or straight-line linkage mechanism, which as designed can function in the relatively limited space available therefor.

*Straight-line linkage mechanism*

This mechanism is built up about a mechanical construction (see Figs. 3, 4 and 6) involving means providing an upper central hinge element 73 which may be viewed as a double hinge element fixedly connected to and extending outwardly from the lower end portion 72 of the torque tube 71 and whereby there is defined by said upper hinge element an upper front pintle element and an upper rear pintle element that together determine an upper horizontally-extending pintle axial line as 74—74 (see Fig. 3). The upper hinge element or elements 73 referred to in fact embody upper centrally-located pintle-providing elements which actually define or determine the location of parallel pintle axes as 74—74 and 74—74 of fixed elevation and positioned equally distant from the vertical axial line of the torque tube 71. In this connection, however, it will be noted that the functional effect is that the upper central hinge element 73—or double hinge element, as it may be called—and a single set of upper hinge elements positioned whereby the two upper pintle axes are designated 74—74, actually coincide and become a single horizontal axis extending through the axial center of the torque tube. For an example of such construction see Figs. 17, 18 and 19.

*Outlying pintle shaft construction 100*

This outlying pintle shaft construction includes the aforementioned outlying pintle shaft 101 of intermediate elevation and the outlying pintle shaft bearing members or body members 103 that are positionable along and when positioned are fixedly secured in place on the progressively approaching channel-iron side bars 75 and 76 of the outwardly-extending power transmission arms 80, of which the wide upper inner ends 81 of said side bars have hinge mountings on the aforementioned upper pintle members or elements 73 that are provided at the lower end 72 of the torque tube 71 and which determine the location of that which may be properly referred to as the upper central horizontally-extending pintle axis 74—74. The positionably secured oulying bearing members 103—103 are located on the medial portion of each of the power transmission arms to which they correspond and as aforementioned are adjustably connected to the channel-iron side bars 75 and 76 thereof. The bearing members 103—103 therefore afford an adjustable mounting for the outlying pintle shaft 101 that provides an outlying pintle axial line 77—77 of intermediate elevation, which extends horizontally and which parallels the axis or axes 74—74, as the case may be, of the upper pintle providing element or elements 73. The details of construction of the bearings members 103—103 and the mode of adjustably connecting the same to the channel-iron side bars 75 and 76 will later be described in connection with Figs. 12 to 16, inclusive.

In the new construction there are provided low central hinge elements as 83, 83 fixedly connected to and extending outwardly from a low portion of the vertically movable rake arm carrying shaft 31 whereby there are defined by said low central hinge elements a low front pintle element or elements and low rear pintle element or elements that determine low central horizontally-extending pintle axial lines or line 84—84 that parallel and directly underlie the upper central horizontally-extending pintle axial lines or line 74—74.

In the new construction there are embodied the sets of stabilizing rods 78 and 79 of which the rods in each set extend upwardly and divergingly outwardly from the lower central pintle providing elements 83, 83, on which the lower ends 86 and 87 of said rods are pivotally mounted, to the outlying pintle providing shaft element 101 and on which the upper outer ends 88 and 89 of said stabilizing rods are pivotally connected. The shaft 101 is positionably supported in and by the positionably secured bearing members 103—103 and defines and determines the outlying pintle axial line 77—77 of intermediate elevation, to wit, at elevation always exactly midway between that of the high pintle axis 74—74 and the low pintle axis 84—84. In this connection it will be noted that the radial length from the upper central pintle axis 74—74 to the outlying pintle axis 77—77 is and must be exactly equal to the effective radial length from the corresponding lower central pintle axis 84—84 provided on the liftable shaft and the corresponding outlying pintle axis 77—77 provided on the power transmission arms by the pintle shaft 101. It will also be noted that the foregoing statement applies to and is readily apparent from the perspective view of Fig. 3 and the side views of Figs. 1, 4, 8, 10 and 17. In the plan view of Figs. 6 and 17 it will also be noted that with respect to the stabilizing rods 78 and 79, each extends from a low portion of the low hinge element of the liftable shaft 31, thence upwardly and divergingly outwardly with respect to each other from the low pintle point thereof to the outlying pintle axis 77—77 and progressively approaches the respective corresponding channel-iron side bars of the power transmission arms and which channel-iron side bars in turn progressively approach each other. Thusly from Figs. 6 and 16 it will be seen that there are truss-type supports provided by the adjacent portions of channel-iron side bars 75 and 76 and the corresponding adjacent stabilizing rods 78 and 79 and thus there results for each arm a pair of truss supports of a type for resisting the lateral movement of the arms as carried by the torque tube 71 on the one hand and aided by the stabilizing rods extending from the liftable rake-arm carrying shaft 31 on the other hand.

The result of this construction is that there is assured continuous concentricity between said torque tube 71 and shaft 31. The construction described above also prevents lateral movement in directions paralleling planes passing through the center of the shaft and paralleling the hinge hintle axes 74—74, 77—77 and 84—84. It has heretofore been mentioned that these stabilizing rods are of the same effective radial length. In installing these stabilizing rods there is required a perfect and final fit with respcet to the built-up structural steel power transmission arms 80 on the one hand and the other welded-together members of the arm structure on the other hand. The vertical location of the pintle axis 74—74 is directly over and paralleling the horizontally-extending location of the pintle axis 84—84. However, the providing of the proper final fixed locations of the pintle axis 77—77 is not so easily accomplished and is attained through and by the medium of a positionable and adjustably fixed outlying bearing member 103.

Outlying pintle shaft bearings 103

As seen from Fig. 3 this outlying bearing is mounted on the medial portion of the channel-iron side bars 75 and 76 of the outwardly-extending power transmission arms 80. Each of the channel-shaped side bars has at the medial portions thereof a set of four bolt-receiving elongated openings 102 disposed in arrangement paralleling the side bars.

Figures 11, 12, 13, 14, 15, 16:
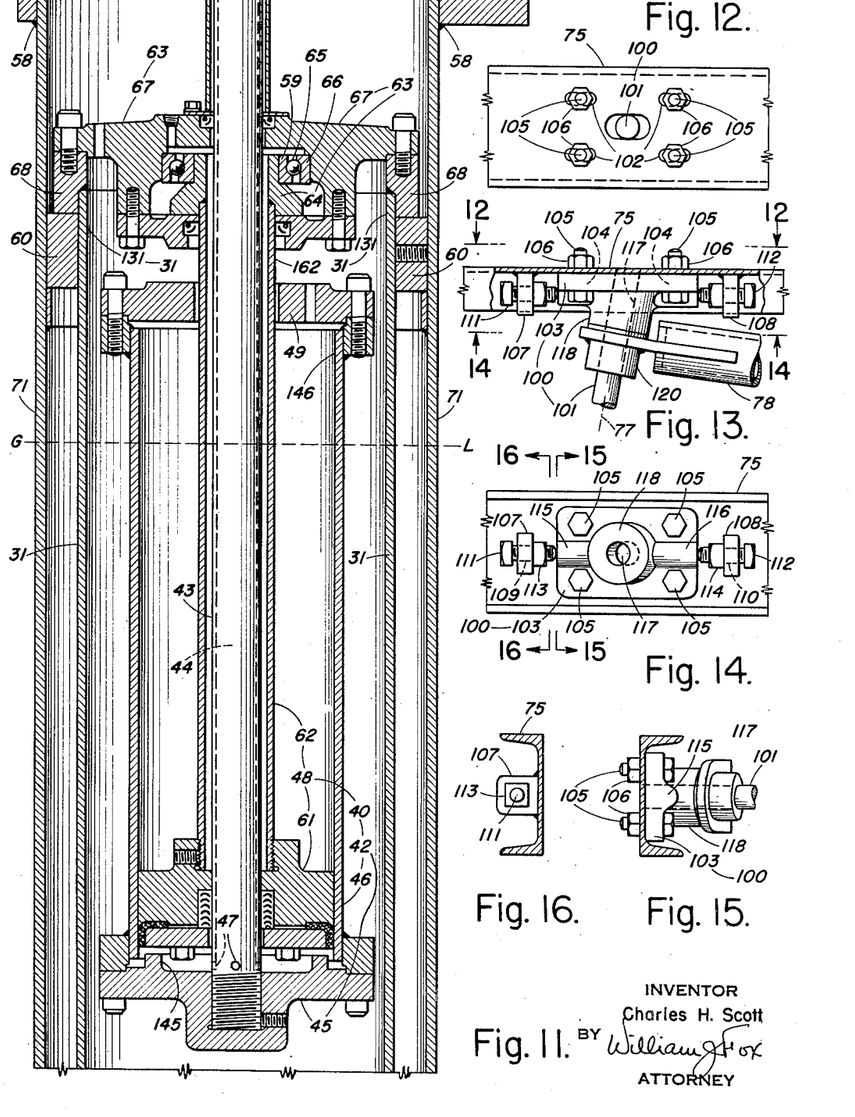
Fig. 11 is a sectional view bringing out in detail certain structural features of the expansible and contractible means that includes said cylinder and the raisable and lowerable piston therein from and through the medium of which an indicated associated auxiliary turntable derives carrying support on and from said piston and in turn dependingly carries therefrom the rake-arm carrying shaft which is vertically lifted at one time or permitted to be lowered at another time, to wit, as and when the piston is respectively being raised or lowered.
Figs. 12 to 16, inclusive, illustrate the details of construction whereby the upper outer end portions of the stabilizing rods are pivotally connected to and adjustably positioned with respect to the medial portions of the two side bars or side channel-shaped members of the outwardly-extending and progressively tapering power transmission arms to which the particular set of stabilizing rods are functionally and operatively connected.

Each outlying bearing construction includes two body members 103 having four bolt-receiving openings 104 arranged for registering with the bolt-receiving elongated openings 102 of the channel-iron side bars 75 and 76 whereby there is provision for permitting longitudinal final adjustment towards and into final holding position therefor when the four bolts 105 provided with nuts 106 are tightened for thusly finally clamping and holding the body 103 in place in adjusted position thereat— see Fig. 13.

Each of the channel-iron side bars 75 and 76, as the case may be, is provided with inwardly-extending lugs 107 and 108 respectively provided with screw-threaded openings 109 and 110 for in turn receiving, adjusting and positioning bolts 111 and 112 respectively equipped with lock nuts 113 and 114 for longitudinally positioning and for holding in adjusted position the bearing body member 103—when that position has been finally determined. In this connection it will be noted that the inner ends of each of the adjusting or positioning bolts 111 and 112, as the case may be, engage end portions of longitudinally-extending inwardly-protruding rib sections 115 or 116 whereby the longitudinal adjustment is facilitated. Also each body member 103 has a horizontally, inwardly and laterally extending boss 118 provided with opening 117 for receiving one end of the outlying pintle shaft 101 of intermediate elevation. The inwardly-protruding rib sections 115 and 116 merge into the boss 118 and as to the latter this has a slight slant with respect to the body portion of the bearing member 103. The boss 118, and the pintle shaft receiving opening 117 therein, is positioned with respect to the body member 103 so that when the outlying bearing construction is in place the pintle shaft 101 and the pintle shaft axial line 77—77 parallels the pintle shaft axial lines 74—74 and 84—84 as previously referred to.

Figures 5, 6, 7:
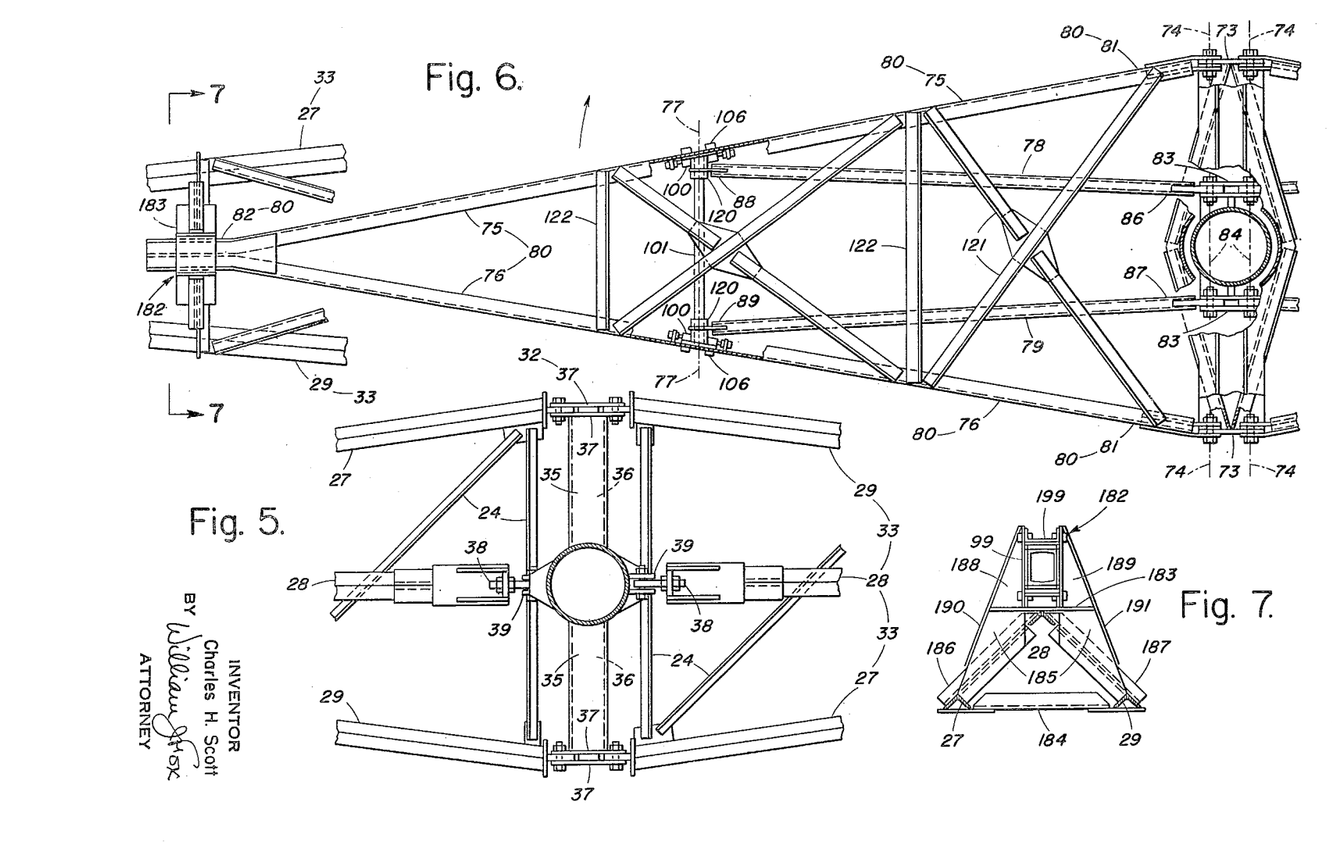
Fig. 5 is a partial horizontal sectional view taken as on the line 5—5 of Fig. 4 looking in the direction of the arrows.
Fig. 6 is a horizontal view taken as on planes indicated by the broken line 6—6 of Fig. 4 looking in the direction of the arrows. In this view there is indicated the hinge connections of one of the power transmission arms to the torque tube, the hinge connections of the inner ends of a corresponding set of stabilizing rods to the liftable rake-arm carrying shaft, the hinge connections as between the outer ends of the stabilizing rods and the intermediate or medial portion of the corresponding power transmission arm, and also the slidable compensating type of driving connection between the outer end of the power transmission arm and the underlying section of the rake-arm to which the connection is made.
Fig. 7 is a vertical transverse sectional view of the rake carrying arm and of the slidable compensating type of driving connection therefor. This is a view taken as on the vertical plane indicated by the line 7—7 of Fig. 6 or line 7—7 of Fig. 8 looking in the direction indicated by the arrows.
Figure 8:
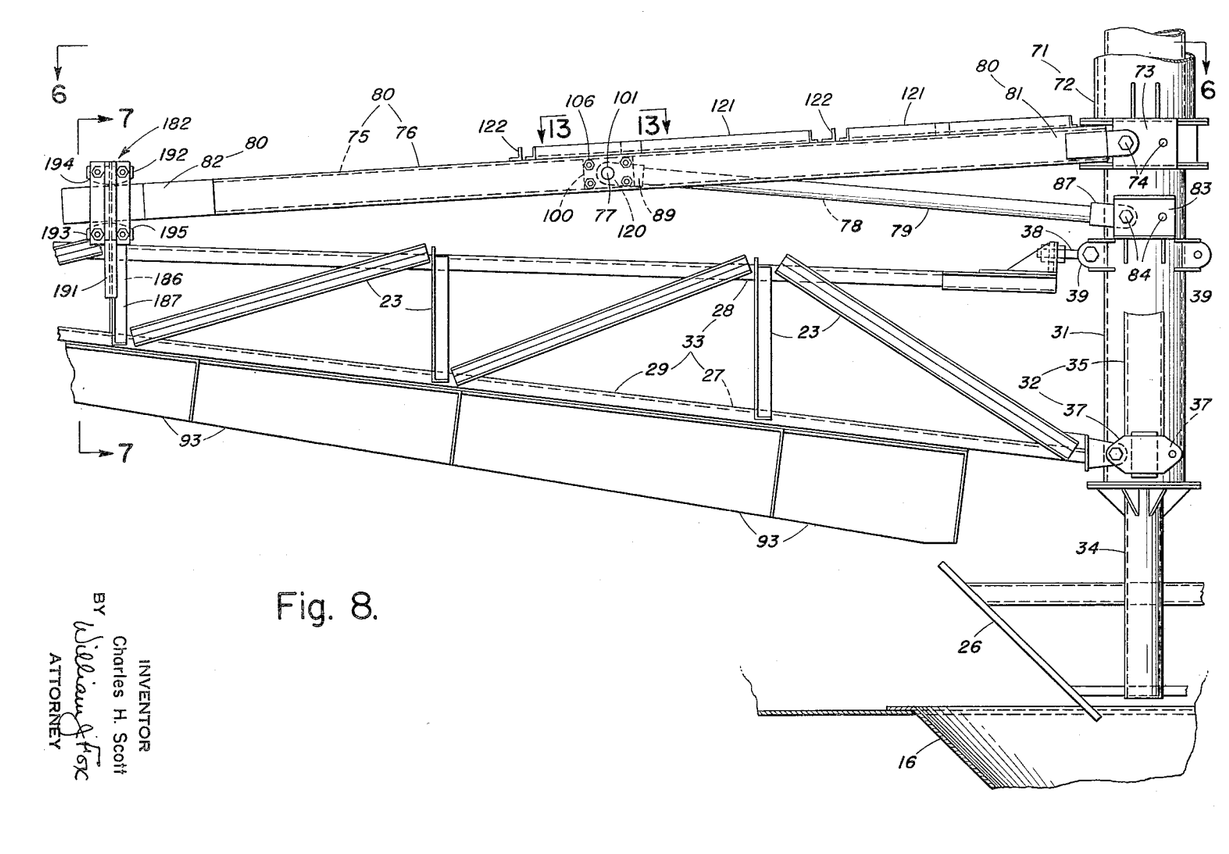
Fig. 8 is a view similar to that of Fig. 4 with the exception that in Fig. 8 the rake structure is in lifted position and the stabilizing rods are in their uppermost position, to wit, at a time when the rake arms are fully lifted.
Figures 17, 18, 19:
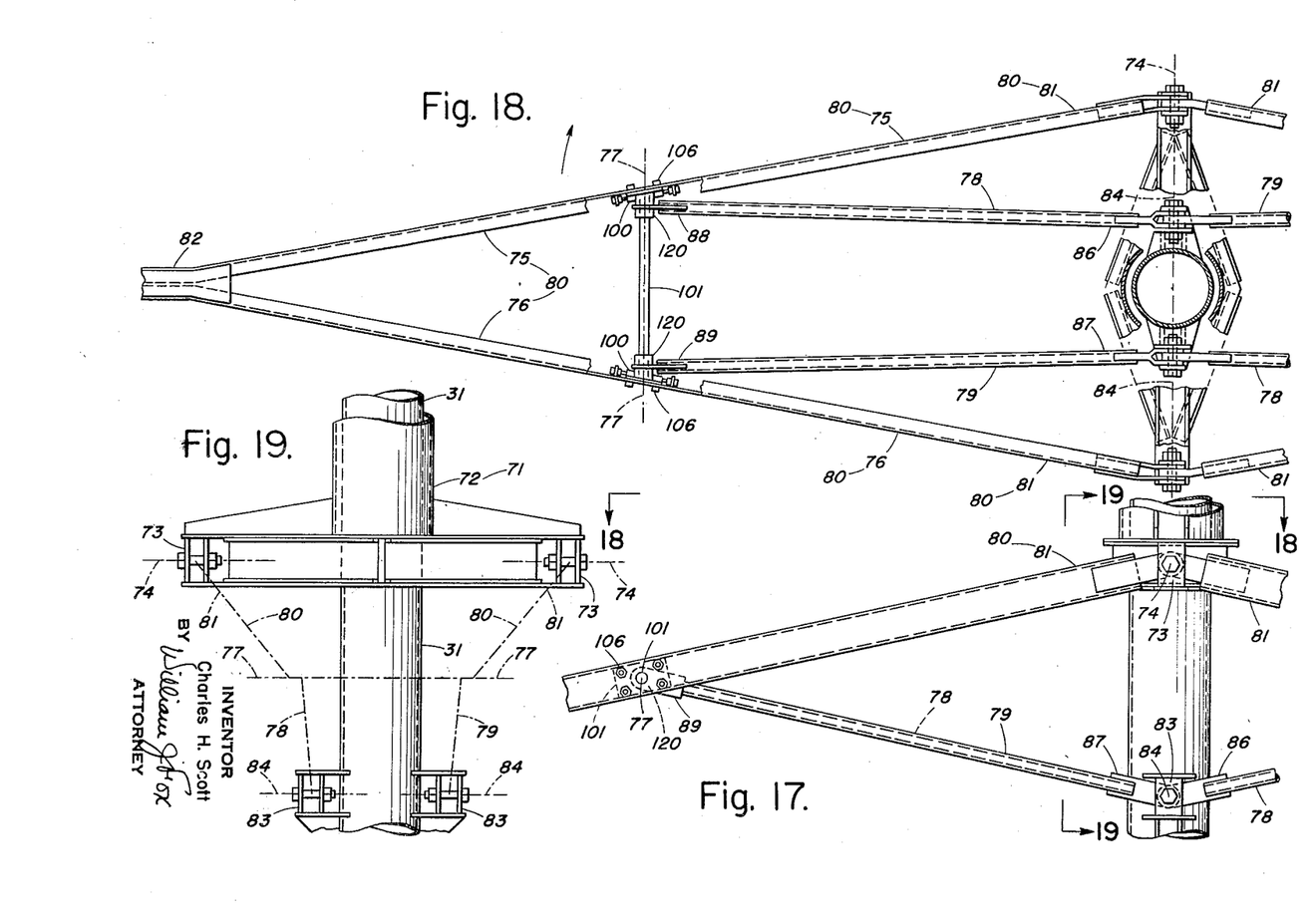
Figs. 17, 18 and 19 show an arrangement of power transmission drive arms and associated stabilizing rods in which the inner ends of corresponding side bars of the power transmission arms are mounted on a single horizontally-extending pintle axis hinge element provided therefor. These figures also indicate how the inner ends of corresponding stabilizing rods are mounted on a single horizontally-extending pintle axis hinge element provided therefor.

Reverting now to the stabilizing rods 78 and 79 it will be noted that the lower inner pivotally mounted ends 86 and 87 thereof are respectively provided with lower hinge elements which are pivotally or swingably mounted on hinge elements or pintle-providing elements that determine the low pintle axis 84—84; that the upper outlying and divergingly positioned ends as 88 and 89 of the stabilizing rods 78 and 79 (see figures such as 7 or 18) are provided with hinge elements as 120—of stabilizing rod 78 or 79, as the case may be—and which hinge elements 120 are pivotally or hingedly mounted on the end portions of outlying pintle shaft 101, to wit, in operative engagement with the laterally-extending bosses 118 of body portion 103.

I claim:

1. A sediment raking mechanism for employment in a settling tank having stationary means fixedly positioned with respect to the tank and functionable as means for supporting said mechanism, which said mechanism when in place and in operative position with respect to the tank comprises in combination and in operative relationship a pair of oppositely-disposed outwardly-extending rake arms turnable as a set about a vertically-extending axis; a vertically-extending rake-arm carrier mounted for turnable movement about said axis; lifting means deriving carrying support from said stationary means and having a member turnable about said axis, and in turn providing lifting and carrying support for and applied at the upper end portion of the rake-arm carrier whereby the latter serves as a turnable depending member functioning under tension and from the lower portion of which said rake arms are carried; a turntable construction having a base member deriving support from said stationary means anad a turntable mounted on said base member for turnable movement about said axis; motivating means for imparting said turnable movement to said turntable; a vertically-extending power transmission torque tube carried by, rigidly connected to, and extending downwardly from said turntable and also concentrically disposed with respect to said liftable rake-arm carrier; a circular guide sleeve functionally disposed between the upper portion of the torque tube and the upper portion of the liftable rake-arm carrier; a pair of oppositely-disposed outwardly-extending relatively stiff power transmission arms corresponding to and vertically-positioned with respect to the aforementioned rake arms, of which said power transmission arms each has a wide inner end portion provided by side members progressively approaching each other and connected to provide a small outer end portion, having intermediate cross braces to afford lateral rigidity to said arms and leaving said widely spaced inner end portions for providing high hinge elements which when the arms are in place are operatively positioned with respect to high hinge pintle providing elements on and at the lower end of the torque tube; said high hinge elements of which the high pintle axis extends horizontally and which high hinge elements are provided on and at the lower end portion of the torque tube and serve to receive the wide horizontally spaced inner hinged end side members of the power transmission arms; and connecting means at the outer end of each power transmission arm by which it is so connected to its corresponding rake arm that there is permitted movement of the outer end of each power transmission arm relative to and along the rake arm to which it corresponds as the rake arms are raised as a set but so as to prevent lateral movement between the outer ends of each power transmission arm relative to the rake arm to which it is connected; said sediment raking mechanism being characterized in that each of said power transmission arms has an outlying hinge element disposed substantially midway between the wide inner end and the narrow outer end portion of said arm and providing an outlying pintle axis paralleling the aforementioned horizontally-extending pintle axis of the high hinge elements upon and by which the inner end of the corresponding power transmission arm is located; said sediment raking mechanism being further characterized in that the liftable rake-arm carrying shaft has low hinge providing elements carried on and at the lower portion of said shaft for providing a low horizontally-extending pintle axis directly underlying and paralleling the high pintle axis determined by the high hinge elements mounted on and turnable with the torque tube and also further characterized in that, for and corresponding to a particular power transmission arm, there is a set of relatively stiff and rigid stabilizing rods horizontally spaced apart, of which the inner ends provide low inner hinge elements having operative connection with the low hinge elements on the liftable rake-arm carrying shaft, while the outer end of said stabilizing rods are provided with hinge elements that are operatively connected to and pivotally mounted on the outlying hinge element located on said power transmission arm, the effective radial length of the distance between the high pintle axis and the outlying pintle axis on the power transmission arm being equal to the radial length of the stabilizing rod which extends from said outlying pintle axis to the low pintle axis provided by the low hinge elements that are on and connected to the liftable rake-arm carrying shaft and which directly underlie the high pintle axis of the high hinge elements that are connected to the lower portion of the turnably driven torque tube.

2. Mechanism according to claim 1 in which the stabilizing rods for and corresponding to each power transmission arm are so located that the inner ends of an associated set of stabilizing rods are closer together than are the corresponding outer end portions of said rods.

3. Construction according to claim 1 in which there is substantially no lateral horizontal play for any of the members of a particular hinge element relative to another.

4. A sediment raking mechanism according to claim 1 in which there is a guiding means at the outer end of each power transmission arm by which the latter is so connected to the corresponding rake arm that there is permitted movement of the outer end of each power transmission arm relative to and along the rake arm to which it corresponds as the rake arms are raised as a set but so as to prevent lateral movement between the outer end of each power transmission arm relative to the rake arm to which it corresponds, and so as to provide driving movement from said power transmission arm to the rake arm to which it is connected, which said guiding means is characterized in that the outer end portion of each power transmission arm is provided by an outwardly directed box-shaped portion rectangular in cross-section that extends into a hollow-open-ended sleeve member that is fixedly positioned upon and secured to the rake arm corresponding to the particular power transmission arm and which said box-shaped end of the power transmission arm is slidably mounted in said open-ended sleeve member.

5. A sediment raking mechanism having a motivated torque tube suitably supported at constant elevation and turnable about a vertically-extending fixed axis; a set of oppositely-disposed outwardly-extending rake arms horizontally turnable about said axis; a vertically-extending rake-arm carrier mounted for turning movement about said axis and from the lower end of which said set of rake arms is supported; liftable means for raising said carrier and for later allowing the lowering of said carrier while continuous concentricity of said carrier with respect to said torque tube is maintained; a set of oppositely-disposed and outwardly-extending power transmission arms, each having wide horizontally-spaced inner end hinge elements provided on progressively approaching side members that narrow down to a small outer end whereat said side members are rigidly connected; each of which power transmission arms overlies an outwardly-extending rake arm corresponding thereto; high hinge elements provided on and with respect to the lower end portion of the motivated torque tube and determining the location of a horizontally-extending high pintle axis of said high hinge elements which are positioned for receiving the widely-spaced inner end hinge elements of the particular power transmission arm; means for connecting the narrow outer end portion of each power transmission arm to the corresponding underlying rake arm whereby the latter can have certain relative movement outwardly and subsequently inwardly with respect to the underlying rake carrying arm as the rake arms are raised and subsequently lowered corresponding to the raising and subsequent lowering of the lifting means for raising and lowering the rake carrying arms; said sediment raking mechanism being characterized in that there are provided low hinge elements, of which the hinged pintle axis determined thereby extends horizontally, which low hinge elements are located at and provided upon a lower portion of the liftable rake-arm carrier at elevation lower than that of the lower end portion of the motivated turnable torque tube and which pintle axis of said low hinge elements extends horizontally and directly underlies the corresponding pintle axis of the aforementioned high hinge elements on the torque tube; in that each of the aforementioned outwardly-extending power transmission arms is provided with a horizontally- but transversely-extending outlying hinge element providing an outlying hinged pintle axis of intermediate elevation paralleling the aforementioned high pintle axis and low pintle axis and which outlying pintle axis is located approximately midway between the high pintle axis for the inner end of a particular power transmission arm and the small outer end of said arm; stabilizing means are provided by and in that stabilizing elements affording a construction for minimizing lateral play and mounted on and extending from the hinge elements providing a low pintle axis on the one hand and reaching outwardly to and mounted on the outlying hinge element providing said outlying pintle axis on the other hand, the effective radial length of the stabilizing means extending between the low pintle axis and the outlying pintle axis being equal to the radial length between the high pintle axis and the outlying pintle axis for the power transmission arm to which the stabilizing means corresponds.

6. A sediment raking mechanism as defined in and by claim 5 in which the hingedly mounted stabilizing means is provided by a set of right and left hand relatively stiff stabilizing rods and of which the hinged inner ends of the rods are in plan closer than is the case of the outer ends thereof because of outward divergence of said rods relative to each other.

7. A sediment raking mechanism according to claim 5 in which the outlying pintle axis is at elevation exactly half way between that of the elevation of the high pintle axis and that of the elevation of the low pintle axis and this regardless of the elevation of the rake carrying arms relative to the low portion of the torque tube.

8. A sedimentation unit comprising a tank having a bottom and a marginal wall rising therefrom; means for supplying liquid-solids mixture to the tank, supernatant liquid withdrawal means leading from the upper portion of the tank, a sediment discharge means leading from said bottom; supporting means fixedly positioned with respect to the tank and in operative position with respect to the foregoing; a horizontal turnable sediment raking mechanism for impelling sedimented material towards the intake section of said sediment discharge means, which said raking mechanism comprises in combination a main turntable construction of constant elevation having a stationary base carried by said supporting means and a power-actuated main turntable mounted on said main stationary base so as to have unidirectional horizontal turning movement about a vertically-extending axial line; motivated means for imparting said turning movement to said turntable; an auxiliary turntable construction comprising a liftable base and auxiliary turntable mounted upon said liftable base in a manner whereby there is provision for horizontal turning movement of the auxiliary turntable about a vertical axial line substantially in alignment with said axial line of the main turntable; lifting means for supporting and raising said liftable base; a depending rake-arm carrying shaft functioning under tension and deriving support from said auxiliary turntable; rake arms extending outwardly and deriving support from the lower portion of said carrying shaft; a depending tubular drive member of interior diameter larger than the outer diameter of the depending rake-arm carrying shaft, said tubular drive member functioning under torsional strains and the upper portion of which is connected to said main turntable so as to be driven thereby as the main turntable is turned and the lower end of which is equipped with a transversely-spaced pair of hinge elements defining the location of a high transversely-extending hinge pintle axis and which hinge elements afford driving support for power transmission arms V-shaped in plan and disposed with the vertex portion of the V outermost and as to which said arms they are hingedly mounted on and are turnably driven through the medium of said hinge elements; connecting means at the outer end of each power transmission arm by which the latter is so connected to its corresponding outwardly-extending rake arm whereby there is imparted turning movement to the rake arms as the power transmission arms are turnably driven but whereby there is permitted movement of the outer end of each power transmission arm relative to its correspondingly driven outwardly-extending rake arm as the rake arms are raised or lowered as a set; said sediment raking mechanism being characterized in that inner end portion of the V-shaped power transmission arms is hingedly mounted on said hinge elements providing said high pintle axis; in that a horizontal transversely-hinged pintle element that determines a hinge pintle axis of intermediate elevation is located on a portion of each power transmission arm in a region thereof intermediate the wide inner end of the arm and the narrow outer end of the arm, in that transversely-spaced hinge elements are provided on a section of the rake-arm carrier shaft which is at elevation below that of the lower end of the depending tubular drive member and which low set of hinge elements determine a low horizontal but transversely-extending hinge pintle axis that parallels the upper hinge pintle axis and the outlying hinge pintle axis aforementioned, in that the radial distance between the high pintle axis and the pintle axis of intermediate elevation is equal to that of the distance between the outlying pintle axis and the low pintle axis, and further characterized in that there is a set of transversely-spaced stabilizing rods providing at the inner end thereof hinge elements which are mounted on the lowly-positioned hinge elements on the liftable depending arm-carrying shaft and of which the outer ends of the stabilizing rods are provided with hinge elements that are mounted on the pintle hinge element providing the outlying pintle axis of intermediate elevation, thusly providing a straight-line linkage that assures concentricity between the low interior portion of the aforementioned tubular drive member on the one hand and the exterior of the liftable depending rake-arm carrying shaft on the other hand.

9. A sedimentation mechanism according to claim 8 in which the stabilizing rods diverge from each other in passing from the hinge elements providing the low hinge pintle axis to the outlying hinge elements which provide the hinge pintle axis of intermediate elevation.

10. A sediment raking mechanism for employment in a settling tank and having means for securing said mechanism in operative position with respect to the tank, which mechanism comprises in operative combination a set of outwardly-extending rake arms which in plan are symmetrically arranged and are turnable as a set about a vertically-extending axis; a vertically-extending liftable and lowerable rake-arm carrier shaft concentrically mounted with respect to said axis; lifting and lowering means having stationary support with respect to said tank and connected for raising and lowering said rake-arm carrier shaft; a turntable construction having a base member deriving support from said stationary means and a turntable mounted on said base member for turnable movement about said axis; motivating means for imparting said turnable movement to said turntable; a vertical power transmission torque tube carried by and extending downwardly from said turntable and concentrically disposed with respect to said vertically-extending rake-arm carrier shaft; a set of outwardly-extending relatively stiff power transmission arms arranged symmetrically in plan, of which the power transmission arms correspond to and are vertically positioned over and relatively to the corresponding vertically-positionable rake-carrying arms, which power transmission arms each has a wide inner end portion provided with side members progressively approaching each other, are cross-braced into a rigid construction and are provided at the outer end portion thereof with box-shaped formations rectangular in cross-section; each of which power transmission arms has a hinged driving connection at the lower end portion of the torque tube but is movable about a horizontally-extending high pintle axial support provided by said driving connection, each of said rake-carrying arms having rigidly connected thereto an open-ended sleeve structure for receiving the box-shaped end portions of the power transmission arms whereby the box-shaped ends have slidable arm-driven engagement with the open-ended sleeve structure on the rake-carrying arm to which they correspond, with the addition that there is provided a stabilizing construction operatively interconnecting said rake-arm carrying shaft with an intermediate portion of a power transmission arm, which construction comprises stabilizing elements hinged at their inner ends to the shaft so as to be movable about a lower horizontal pintle axis extending below and parallel to the pintle axis of said high pintle axial support, said stabilizing elements being hingedly connected at their outer ends to said intermediate portion of the power transmission arm, which connection provides upon said arm an outlying pintle axis parallel to said high and said low pintle axis and disposed at elevation halfway between said high and said low pintle axis, the effective radial length of the stabilizing means extending between the low pintle axis and the outlying pintle axis and thus being equal to the radial length between the high pintle axis and the outlying pintle axis for the power transmission arm to which the stabilizing means corresponds.

11. A sediment raking mechanism according to claim 10 in which the open-ended sleeve structure is provided with an upper slide filler member providing a downwardly-curved face and a lower slide filler member providing an upwardly-curved face member for engagement respectively by the upper and lower face portions of the box-shaped ends of the power transmission arms.

CHARLES H. SCOTT.

References Cited in the file of this patent

UNITED STATES PATENTS

| Number | Name | Date |
|---|---|---|
| 2,122,384 | Scott | June 28, 1938 |
| 2,437,761 | Scott | Mar. 16, 1948 |
| 2,528,051 | Graner | Oct. 31, 1950 |